UNITED STATES PATENT OFFICE 2,334,517

HIGH MOLECULAR WEIGHT SURFACE ACTIVE AMINES

Nathaniel Beverley Tucker, Glendale, Ohio, assignor to The Procter and Gamble Company, Ivorydale, Ohio, a corporation of Ohio No Drawing. Application March 28, 1941, Serial No. 385,779

12 Claims. (Cl. 260—584)

This invention relates to new compositions of matter for use in the textile and related industries, and to processes for preparing the same. More particularly the invention relates to a new class of surface active high molecular amino compounds.

It is an object of my invention to provide a new class of surface active amino compounds which are water-soluble even without the presence of water solubilizing groups derived from polybasic inorganic acids such as sulfuric acid, and which exert detergent and emulsifying action in neutral, acid and alkaline baths. Other objects will be apparent from the following description of my invention.

Compounds coming within the scope of my invention may be represented by the following general formula

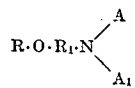

where R is an alkyl radical having eight to twenty-two carbon atoms, $R_1$ is a hydroxy alkylene radical having not more than four carbon atoms connected to R through an ether linkage, A is hydrogen, an alkyl radical, an alkylol radical, or an alkylene radical, and $A_1$ is an alkylol radical, or, when A is alkylene, an alkylene radical, the alkylene radicals when present being joined through an oxygen atom to form the grouping

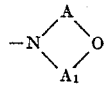

and the radicals represented by A and $A_1$ each having not more than four carbon atoms. It is to be understood that the term "alkylol" includes hydroxy alkyl radicals having one or a plurality of hydroxy groups.

The compounds of my invention may be considered to be derivatives of hydroxy amines having at least two hydroxyl groups and not more than 4 carbon atoms, such as for example glycerylamine, in which derivatives one hydroxyl group is etherified with an alcohol having from eight to twenty-two carbon atoms and in which at least one amino hydrogen is replaced by an alkylol group having not more than four carbon atoms. With one amino hydrogen replaced with such an alkylol group, the other amino hydrogen may be unchanged or replaced by alkyl or alkylol having not more than four carbon atoms. As the following description will reveal, derivatives which correspond for example to those in which one molecule of water has been split out from two alkylol groups replacing the amino hydrogens thereby connecting two alkylene radicals with an oxygen atom also come within the scope of this invention.

While I have indicated above that the compounds of my invention may be considered as derivatives of hydroxy amines such as glycerylamine, it is not necessary that the hydroxy amines be employed as the starting material. In fact, it is more convenient to begin with a suitable epihalohydrin such as an epibromohydrin or an epichlorhydrin and etherify in accordance with known methods with a high molecular weight alcohol and then condense the product with a suitable primary or secondary amine to yield the products of the present invention. If the epihalohydrin contains the epoxy structure in the 1,2 position, then it is possible to produce from the ether prepared therefrom the corresponding glycidyl ether which under suitable conditions may also be reacted with suitable primary or secondary amines to yield the products of my invention.

The properties of my compounds will of course vary somewhat depending on the materials from which they are derived but all will possess wetting, sudsing, emulsifying and detergent power, making them especially suitable for use in the textile and related industries. Thus while the following examples of my invention are specific in nature and describe in a limited way the preparation of preferred compounds, it will be understood that the invention is not limited thereto but rather to the scope of the appended claims.

*Example 1.*—In a known manner lauryl alcohol is reacted with epichlorhydrin in the presence of a suitable catalyst such as stannic chloride, antimony pentachloride, boron trifluoride, or perchloric acid, to produce lauryl monochlorhydrin ether. Although good yields of lauryl monochlorhydrin ether are obtained under normal conditions of reaction, it may be desired to obtain a substantially pure product, in which case the products of the above reaction may be dissolved in ether and washed with water and subsequently fractionally distilled.

Fifty-six parts of the lauryl monochlorhydrin ether thus formed are mixed with 23 parts of diethanolamine and the mixture is heated with stirring for about 2½ hours at 170° to 180° C. Residual hydrochloric acid may then be eliminated by boiling the reaction mix with caustic soda solution for a brief period. If desired, this product may be purified by washing an ether solution of same with water, following which the product may be recovered from the ether solution.

A product prepared in accordance with this example consisted predominantly of a compound having the formula

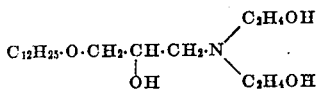

and possessed surface active properties as well as detergent, wetting, sudsing and emulsifying power.

*Example 2.*—The lauryl monochlorhydrin ether prepared in Example 1 is converted to lauryl glycidyl ether by refluxing at atmospheric pressure a mixture of 60 parts of the monochlorhydrin ether with 12 parts sodium hydroxide in 20 parts water. The ether is washed with water and subsequently recovered.

To 48 parts of the lauryl glycidyl ether are added 20 parts of morpholine and the mixture is heated to refluxing at 150 to 160° C. under a blanket of nitrogen. After the reaction has reached substnatial completion, as is indicated when a sample of the reaction mix dissolves to a clear solution in a normal hydrochloric acid solution, the excess or unreacted morpholine may be removed by continuing the heating under vacuum and passing a stream of nitrogen gas therethrough. A product prepared in accordance with the above procedure will closely correspond to one having the following formula

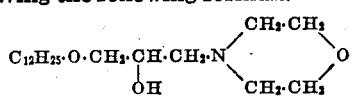

This product was surface active and was found to be suitable for use in the treatment of textiles where an emulsifying, penetrating and softening agent is desired.

*Example 3.*—Tetradecyl glycidyl ether is prepared in a manner similar to that employed in the preparation of lauryl glycidyl ether above described.

To 54 parts of the tetradecyl glycidyl ether are added 49 parts trimethylolaminomethane corresponding to the ratio of 1 mol ether to 2 mols amine, and the mixture is stirred while slowly heating to 170° C. Reaction is allowed to proceed at 170° to 180° C. for about an hour, after which the product is freed from excess amine by washing an ether solution of the reaction product with brine. A product so prepared consisted predominantly of a compound having the formula

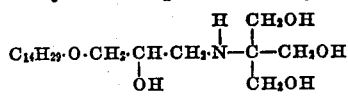

and possessed surface active properties as well as wsahing, wetting, sudsing and emulsifying power in aqueous solution.

The higher alcohols which may be employed in preparing my compounds may have from eight to twenty-two carbon atoms, the choice of molecular weight of course depending on the tendency of the remaining portion of the molecule toward water solubility. Thus with the compound prepared from an alkylol amine which lends extreme water solubility to the product, higher molecular alcohols which are more fatty in nature such as oleyl or stearyl alcohols should be employed so as to obtain a balanced molecule. On the other hand, if the amine employed does not possess outstanding water solubilizing properties to any great degree, then the lower alcohols from $C_8$ to $C_{10}$ should be employed. For average performance I find that lauryl alcohol derived for example from coconut oil is especially useful. Of course it is not essential that pure saturated or unsaturated alcohols of definite constitution be employed. Mixtures of alcohols derived from the natural fats, fatty oils and waxes may be employed with equal facility, and in some instances with advantage because of the wider range of characteristics thus obtained. I have found for example, that Lorol (the mixture of higher alcohols obtained from coconut oil and consisting predominantly of $C_{12}$ and $C_{14}$ alcohols) is especially useful, and of course alcohols corresponding to the mixed acids contained in other tropical nut oils such as palm kernel oil, etc., may likewise be employed. Synthetic alcohols such as octanol, undecanol, pentadecanol, and the paraffin alcohols may also be used.

Instead of epichlorhydrin as the starting material any other similar compound containing not more than four carbon atoms, such as betamethyl epichlorhydrin, 1 bromo 2-3 epoxy butane, or 1 chloro 3-4 epoxy butane may be employed in preparing the surface active amino compounds of my invention.

Examples of alkylolamines which may be employed in the preparation of the compounds of my invention as set forth herein are as follows.

1. 2 amino 2 methyl propane diol 1,3

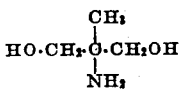

2. The secondary amine corresponding to (1).

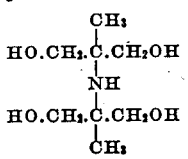

3. 2 amino 2 methyl propanol 1

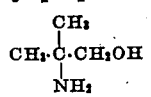

4. The secondary amine corresponding to (3).

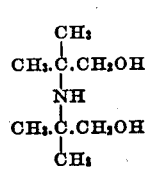

5. Glycerylamine

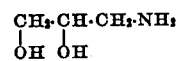

6. Diglycerylamine

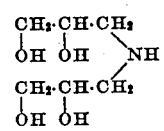

7. Morpholine

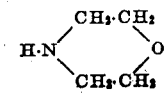

8. 3,5 bis (hydroxy methyl) morpholine

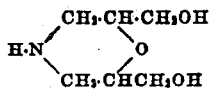

9. Monoisopropanolamine

10. Diisopropanolamine

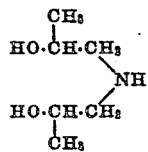

11. Butyl ethanolamine

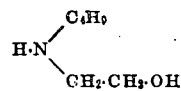

12. Ethyl ethanolamine

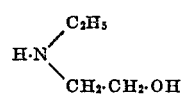

13. Monoethanolamine

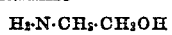

14. Diethanolamine

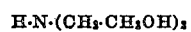

15. Trimethylolaminoethane

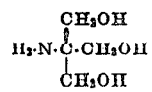

Thus it will be noted from the above examples and description that the products of my invention may be prepared by reacting a compound of the formula, R·O·B, where R is an alkyl radical having eight to twenty-two carbon atoms and B is a radical of the group consisting of epoxy alkyl and halohydroxy alkyl radicals containing no more than four carbon atoms with an amine of the general formula

in which A is hydrogen, an alkyl radical, an alkylol radical, or an alkylene radical, and A₁ is an alkylol radical, or, when A is alkylene, an alkylene radical, the said alkylene radicals being joined through an oxygen atom to form the grouping

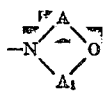

and the radicals represented by A and A₁ having not more than four carbon atoms.

As stated above, the products of my invention possess wetting, sudsing, emulsifying and detergent power and therefore find use in the textile and related industries. Thus, for example, they may be used in the softening of textiles and as assistants in removal of lubricating or throwing oils from textile fibers in a manner known to those versed in the art. My compositions also find use in baths employed in the treatment of leather, in dyeing, and in acid baths to which it is desired to impart emulsifying or penetrating properties. The agents of my invention may be employed as emulsion stabilizing agents or emulsifying agents in the manufacture of cosmetics. Of course other various and sundry uses may be mentioned but these will be obvious to those familiar with the arts employing materials possessing the properties heretofore given.

Having thus described my invention, what I claim and desire to secure by Letters Patent is:

1. A water-soluble surface active amino compound having wetting, sudsing, detergent and emulsifying action in aqueous media and having the general formula

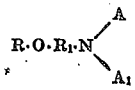

wherein R is an alkyl radical having eight to twenty-two carbon atoms, R₁ is a hydroxy alkylene radical having not more than four carbon atoms connected to R through an ether linkage, A is selected from the group consisting of hydrogen, an alkyl radical and an alkylol radical, and A₁ is an alkylol radical, the radicals represented by A and A₁ each having not more than four carbon atoms.

2. A water-soluble surface active amino compound having wetting, sudsing, detergent and emulsifying action in aqueous media and having the formula

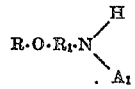

in which R is an alkyl radical having eight to twenty-two carbon atoms, R₁ is a hydroxy alkylene radical having not more than four carbon atoms connected to R through an ether linkage and A₁ is an alkylol radical having not more than four carbon atoms.

3. A water-soluble surface active amino compound having wetting, sudsing, detergent and emulsifying action in aqueous media and having the formula

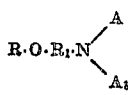

in which R is an alkyl radical having eight to twenty-two carbon atoms, R₁ is a hydroxy alkylene radical having not more than four carbon atoms connected to R through an ether linkage, and A and A₁ are alkylol radicals having not more than four carbon atoms.

4. A water-soluble surface active amino compound having wetting, sudsing, detergent and emulsifying action in aqueous media and having the formula

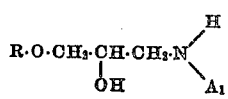

in which R is an alkyl radical having eight to twenty-two carbon atoms, and A₁ is an alkylol radical having not more than four carbon atoms.

5. A water-soluble surface active amino compound having wetting, sudsing, detergent and emulsifying action in aqueous media and having the formula

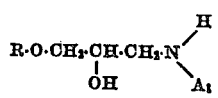

in which R is an alkyl radical having eight to twenty-two carbon atoms, and A and A₁ are alkylol radicals having not more than four carbon atoms.

6. A water-soluble surface active amino compound having wetting, sudsing, detergent and emulsifying action in aqueous media and having the formula

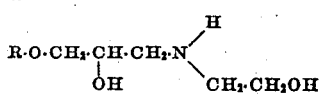

in which R is the alkyl radical of lauryl alcohol.

7. A water-soluble surface active amino compound having wetting, sudsing, detergent and emulsifying action in aqueous media and having the formula

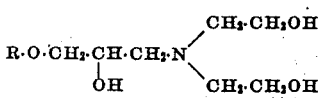

in which R is the alkyl radical of n-tetradecyl alcohol.

8. In the process of preparing water-soluble high molecular weight surface active amines having wetting, sudsing, detergent and emulsifying action in aqueous media, the steps comprising reacting a compound of the formula R·O·B where R is an alkyl radical having eight to twenty-two carbon atoms and B is an epoxy alkyl radical containing not more than four carbon atoms, with an amine of the general formula

in which A is a member of the group consisting of hydrogen, an alkyl radical and an alkylol radical and an alkylene radical, and A₁ is an alkylol radical, the radicals represented by A and A₁ having not more than four carbon atoms.

9. In the process of preparing water-soluble high molecular weight surface active amines having wetting, sudsing, detergent and emulsifying action in aqeuous media, the steps comprising reacting a compound of the formula R·O·B where R is an alkyl radical having eight to twenty-two carbon atoms and B is an epoxy alkyl radical containing not more than four carbon atoms, with a monoalkylolamine having not more than four carbon atoms, and having at least one hydrogen atom joined to the nitrogen atom.

10. In the process of preparing water-soluble high molecular weight surface active amines having wetting, sudsing, detergent and emulsifying action in aqueous media, the steps comprising reacting a compound of the formula R·O·B where R is an alkyl radical having eight to twenty-two carbon atoms and B is an epoxy alkyl radical containing not more than four carbon atoms, with a dialkylolamine having not more than four carbon atoms in each alkylol group and having a hydrogen atom joined to the nitroegn atom.

11. In the process of preparing water-soluble high molecular weight surface active amines having wetting, sudsing, detergent and emulsifying action in aqueous media, the steps comprising reacting tetradecyl glycidyl ether with diethanolamine.

12. In the process of preparing water-soluble high molecular weight surface active amines having wetting, sudsing, detergent and emulsifying properties in aqueous media, the steps comprising reacting lauryl glycidyl ether with monoethanolamine.

NATHANIEL BEVERLEY TUCKER.

---

Certificate of Correction

Patent No. 2,334,517.  November 16, 1943.

NATHANIEL BEVERLEY TUCKER

It is hereby certified that errors appear in the printed specification of the above numbered patent requiring correction as follows: Page 2, first column, line 27, for "substnatial" read *substantial*; line 34, strike out the word "will" and same line, for "correspond" read *corresponded*; line 64, for "wsahing" read *washing*; page 3, second column, lines 70, 71, and 72, claim 5, strike out the formula and insert instead the following—

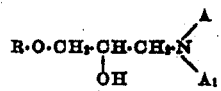

page 4, first column, line 38, claim 8, strike out "and an alkylene radical"; and second column, line 6, claim 9, for "aqeuous" read *aqueous*; line 24, claim 10, for "nitroegn" read *nitrogen;* and that the said Letters Patent should be read with these corrections therein that the same may conform to the record of the case in the Patent Office.

Signed and sealed this 15th day of February, A. D. 1944.

[SEAL]

HENRY VAN ARSDALE,
*Acting Commissioner of Patents.*

Certificate of Correction

Patent No. 2,334,517.  November 16, 1943.

NATHANIEL BEVERLEY TUCKER

It is hereby certified that errors appear in the printed specification of the above numbered patent requiring correction as follows: Page 2, first column, line 27, for "substnatial" read *substantial*; line 34, strike out the word "will" and same line, for "correspond" read *corresponded*; line 64, for "wsahing" read *washing*; page 3, second column, lines 70, 71, and 72, claim 5, strike out the formula and insert instead the following—

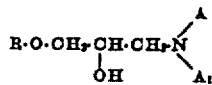

page 4, first column, line 38, claim 8, strike out "and an alkylene radical"; and second column, line 6, claim 9, for "aqeuous" read *aqueous;* line 24, claim 10, for "nitroegn" read *nitrogen;* and that the said Letters Patent should be read with these corrections therein that the same may conform to the record of the case in the Patent Office.

Signed and sealed this 15th day of February, A. D. 1944.

[SEAL]

HENRY VAN ARSDALE,
*Acting Commissioner of Patents.*